April 15, 1969  R. H. BAUER ET AL  3,439,075
METHOD FOR INSULATING PIPES
Filed May 23, 1966  Sheet 4 of 5

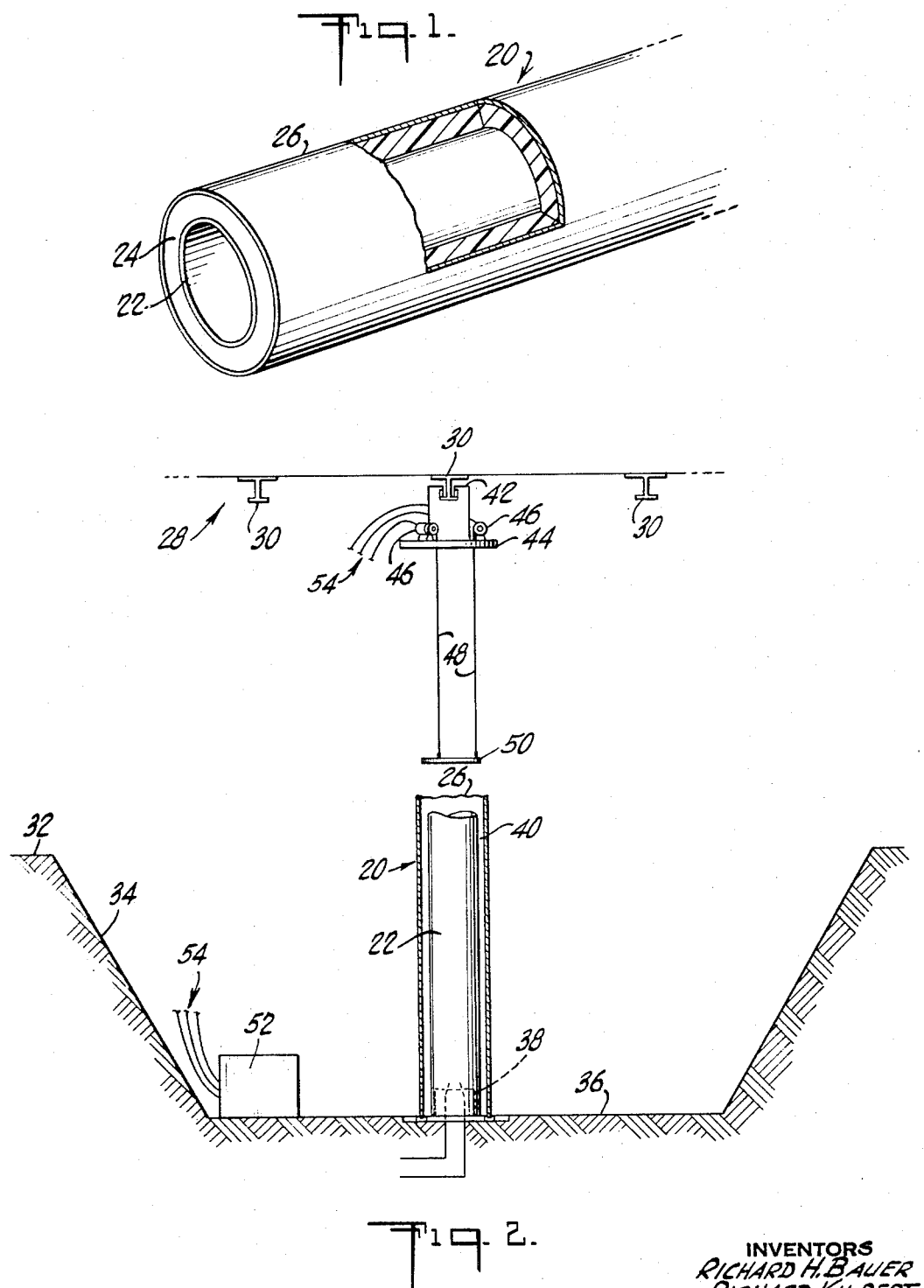

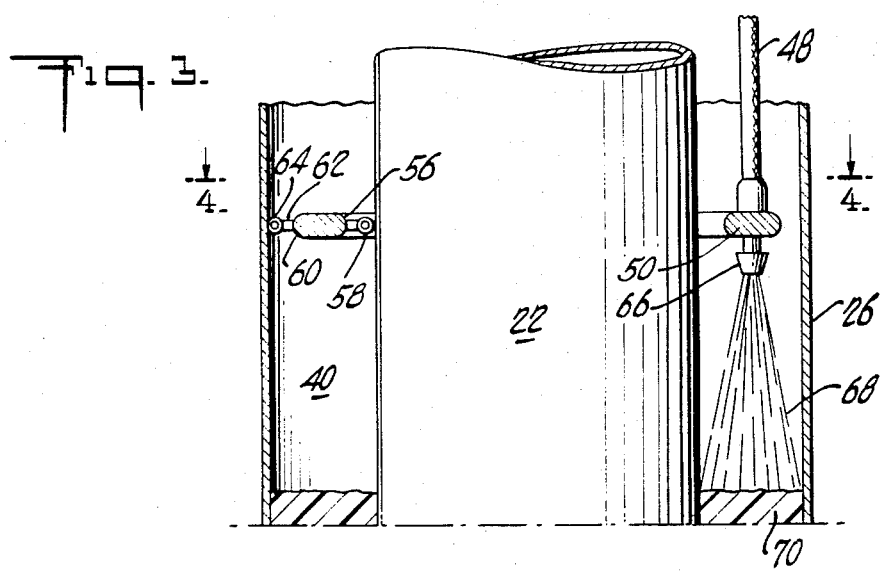
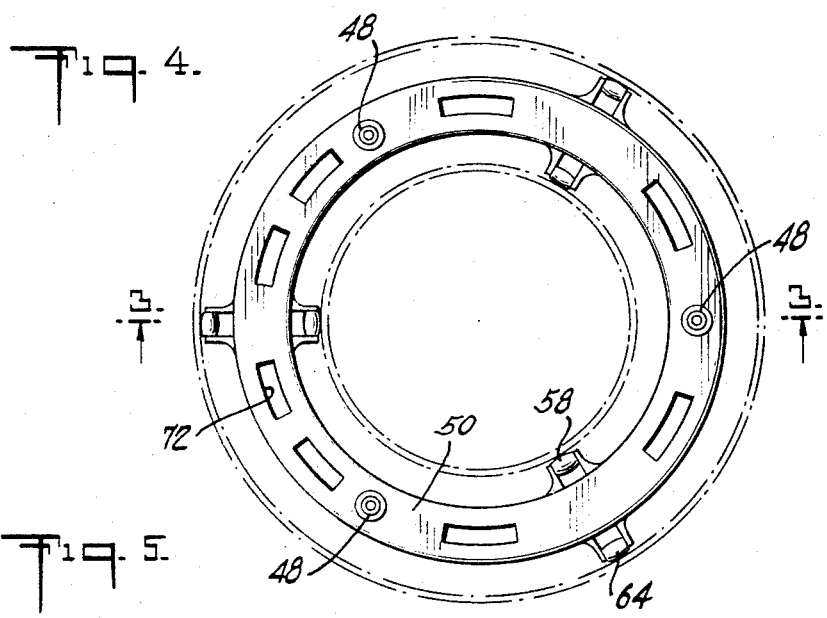
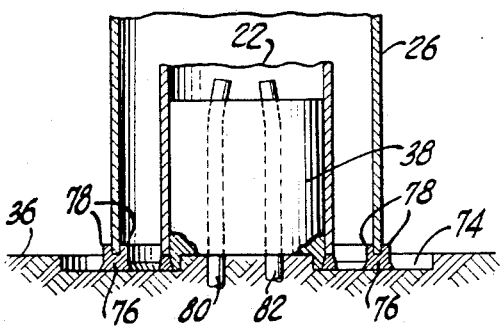

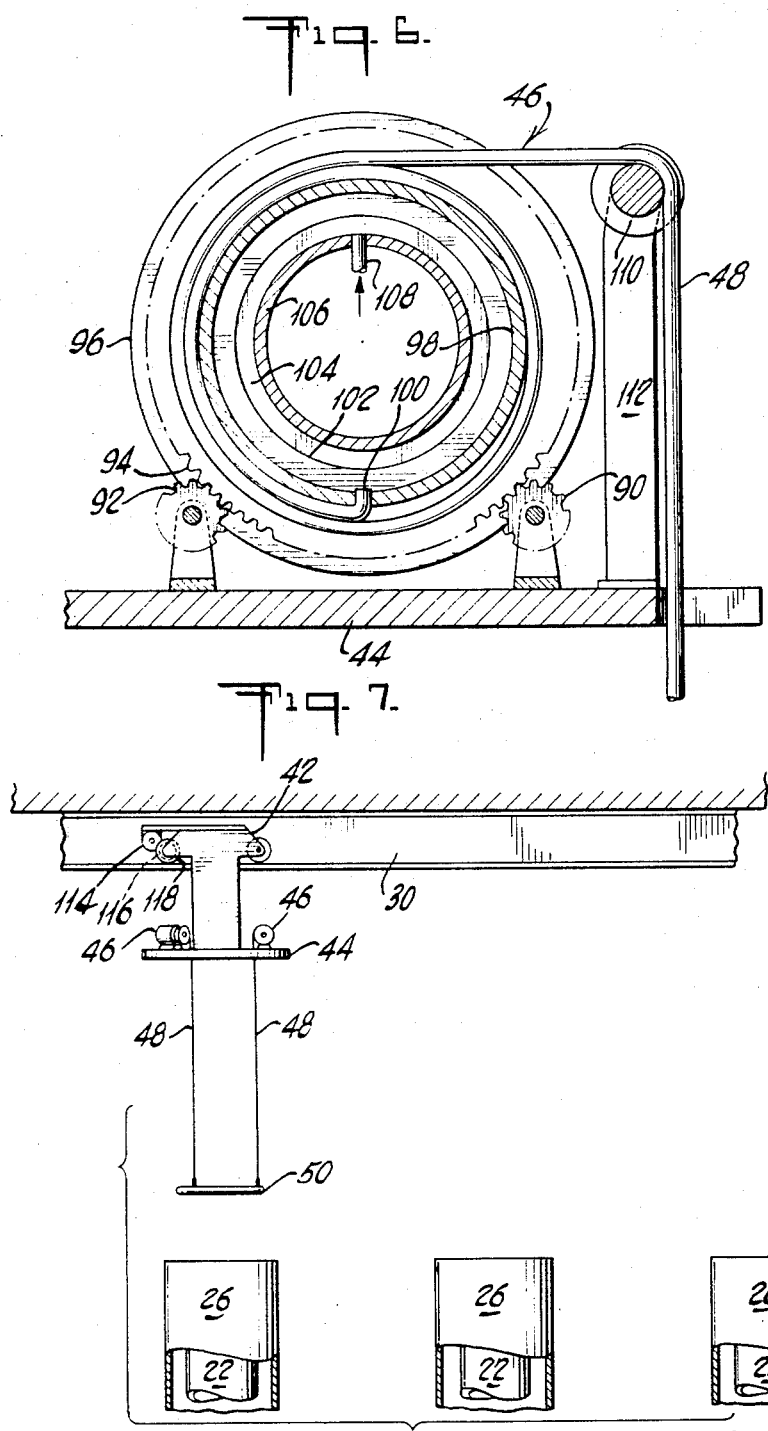

INVENTORS
RICHARD H. BAUER
RICHARD KILPERT
BY
Donald F. Wohlers
ATTORNEY

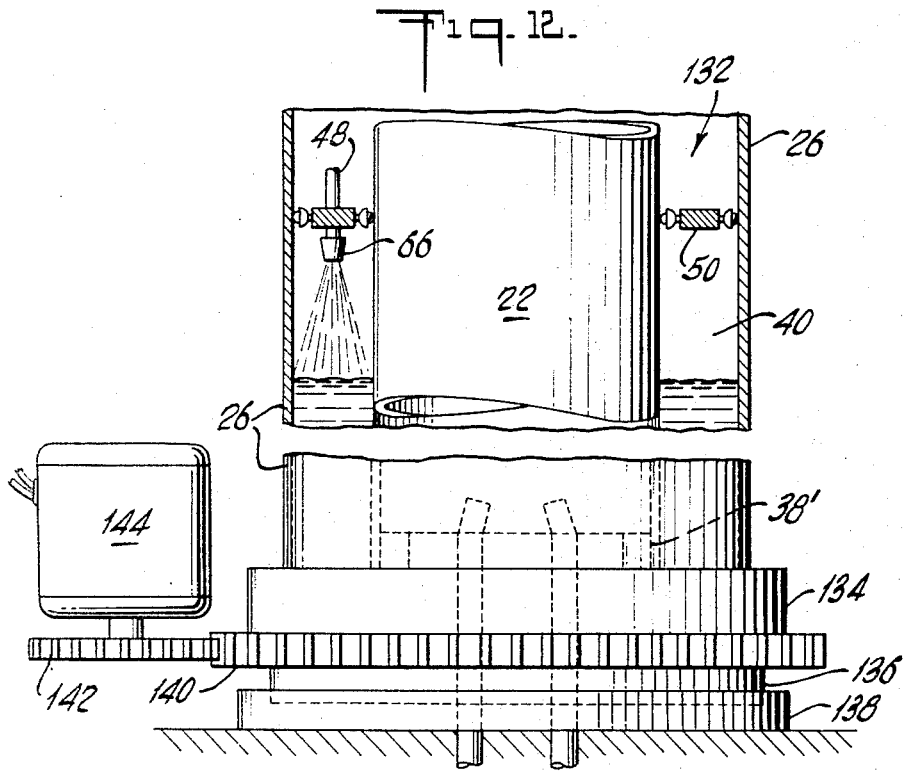
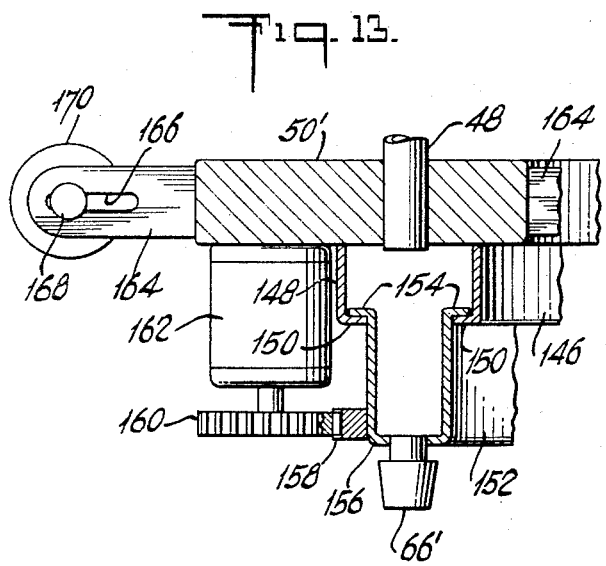

United States Patent Office 3,439,075
Patented Apr. 15, 1969

3,439,075
METHOD FOR INSULATING PIPES
Richard H. Bauer, West Caldwell, and Richard Kilpert, Berkeley Heights, N.J., assignors to Esso Research and Engineering Company, a corporation of Delaware
Filed May 23, 1966, Ser. No. 552,196
Int. Cl. B28b 21/42; B29d 27/02
U.S. Cl. 264—45                                    4 Claims

ABSTRACT OF THE DISCLOSURE

A method of pouring a foamable plastic insulation between inner and outer pipes held in a vertical position wherein an insulation filling ring is lowered to the bottom of the space and gradually raised. The filling ring ejects plural streams of foamable plastic and functions to concentrically space the pipes and may be either oscillated or rotated as it is raised. The interior of the inside pipe is heated throughout its length during the foam filling process.

---

The present invention relates to insulated pipes.

In particular, the present invention relates to pipes which are encased within insulation capable of maintaining fluid within the pipes insulated from the influences of outside temperatures. For example, pipes of such a construction are particularly applicable to the field of cryogenics and also to the transportation of liquids at elevated temperatures.

The expense associated with applying preformed insulation to large or small diameter pipes is often disproportionately high because of the amount of manual labor involved in cutting, trimming, and strapping or bonding preformed insulation to the pipes. The applied cost of such an insulation is further increased due to the necessity of providing an impermeable vapor barrier over the insulation if the pipe is to be employed below ground, underseas or in other environments where moisture penetration may limit the efficiency or life of the insulation.

In order to reduce costs associated with the application of insulation to the pipe, it has been proposed to apply commercially available foam insulations, such as polyurethane, by means of a spray to the pipes or vessels which are to be insulated. The use of semi-automated spray rigs can indeed substantially reduce the labor costs required by the application procedure. However, spray-insulated pipes still require the separate and relatively expensive application of a vapor barrier to the exterior of the insulation. In addition, the thickness of the insulation which may be satisfactorily applied by spraying is generally limited to less than 3 inches. Furthermore, sprayed pipes with common vapor barriers such as vapor barriers made of bitumastics or bituplatsics cannot be easily handled without damage to the insulation system, this system being made up of the pipe plus the insulation plus the vapor barrier.

It is accordingly a primary object of the present invention to provide a pipe insulating method which will avoid the above drawbacks.

Thus, it is an object of the invention to provide a pipe insulating method which is far more economical than known methods capable of providing a foamable insulation for a pipe.

In addition, it is an object of the invention to provide a method capable of locating on the exterior of a pipe a layer of insulation which is not only easy to apply and which can be applied at little cost, particularly insofar as labor costs are concerned, but which in addition is not limited to a thickness of 3 inches.

Furthermore, it is an object of the invention to provide a pipe insulating method which results in an ultimate construction which is far more advantageous to handle and far less costly to transport than known systems which are presently in use.

According to the present invention, the method of insulating the pipe includes steps of positioning the pipe which is to be insulated in an upright position surrounded by a tubular mold which is spaced from the pipe and defines therewith an elongated tubular space limited inwardly by the exterior surface of the pipe and outwardly by the interior surface of the mold. This upright tubular space is then progressively filled from the bottom toward the top with insulation.

Another object of the invention is to produce a novel foam insulation casting technique which does not produce the ordinary shearing forces associated with expanding foam in a horizontal casting method.

The invention is illustrated, by way of example, in the accompanying drawings which form part of this application and in which:

FIG. 1 is a perspective, partly sectional illustration of an insulated pipe system manufactured with the method and apparatus of the present invention;

FIG. 2 is a schematic transverse elevation illustrating the manner in which the method and apparatus of the present invention operates to produce a structure as shown in FIG. 1;

FIG. 3 is a partly sectional elevation, on an enlarged scale as compared to FIG. 2, showing the manner in which the filling of the tubular space with insulation progresses according to the invention, FIG. 3 being taken along line 3—3 of FIG. 4 in the direction of the arrows;

FIG. 4 is a sectional plan view taken along line 4—4, of FIG. 3 in the direction of the arrows;

FIG. 5 is a partial sectional view showing the bottom end of the pipe which is to be insulated;

FIG. 6 is a schematic, partly sectional illustration on an enlarged scale, as compared to FIG. 2, of an electrically actuated winch structure and a combined conduit and cable system;

FIG. 7 is a fragmentary schematic longitudinal sectional elevation, taken at right angles to FIG. 2, showing the manner in which the method of the invention is carried out in a plant where insulated pipes are manufactured;

Figure 8:
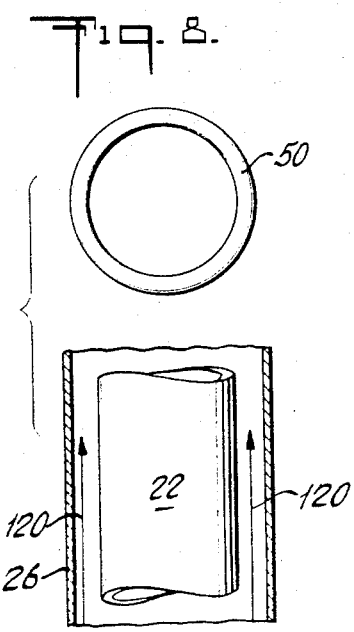
Figure 9:
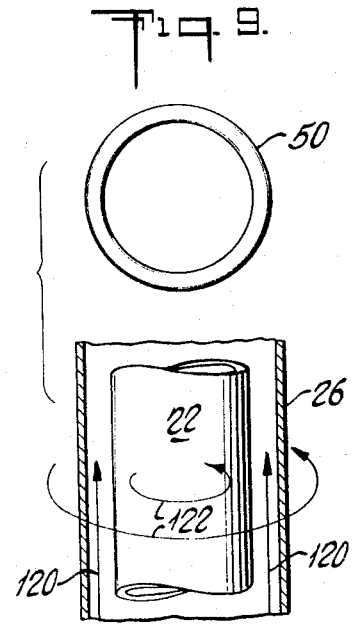
Figure 10:
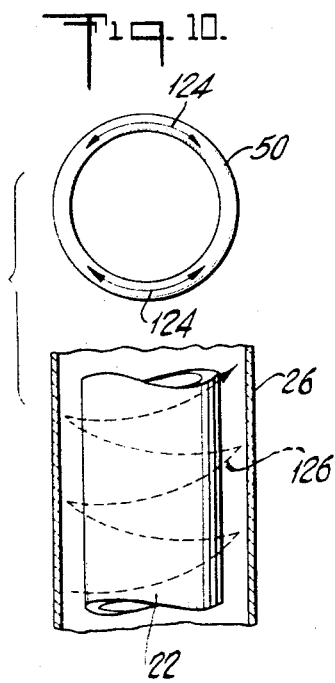
Figure 11:
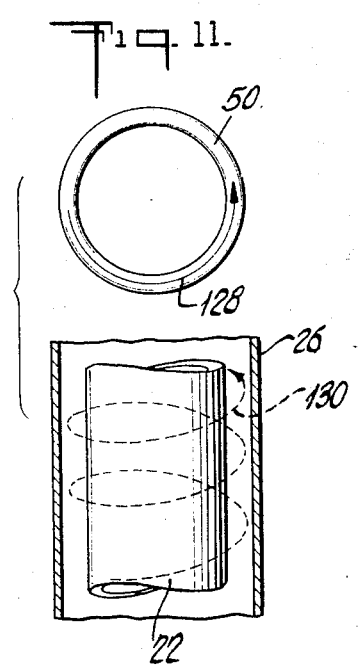

FIGS. 8–11 respectively illustrate schematically different procedures which may be carried out during filling of the tabular space between a pipe and mold;

FIG. 12 is a schematic illustration of one possible structure which may support the pipe and mold in order to carry out a procedure such as that shown in FIGS. 9–11; and FIG. 13 is a fragmentary schematic illustration of another embodiment of this structure which may be used to carry out a procedure such as that indicated in FIGS. 10 and 11.

Referring now to FIG. 1, there is shown a conduit 20 having the structure of the present invention. The conduit 20 includes an inner pipe 22 surrounded by insulation 24 which directly engages the exterior surface of the pipe 22. The insulation 24 itself is surrounded by a tubular member 26 which forms a vapor barrier, so that the insulation 24 will be protected when the conduit 20 is situated in a location such as below the surface of the ground, underseas, and the like. The pipe 22 may be made of metal or plastic, and the same is true of the tubular vapor barrier element 26. The insulation 24, is preferably a foam plastic insulation, such as polyurethane.

It has been suggested, as an alternate to mounting prefabricated shells of insulation directly on the exterior surface of the pipe 22, to spray the insulation 24 onto the exterior surface of the pipe 22 and to thereafter apply a bitumastic or wrapped paper vapor barrier thereover. However, this system carried with it the disadvantage of the practical limitation of the insulation thickness to approximately 3 inches and considerable cost in applying the subsequent vapor barrier.

In accordance with the present invention, these drawbacks are avoided by vertically positioning the pipe 22 and vapor barrier 26 in co-axial relation and sequentially filling the void space therebetween in the manner shown schematically in FIG. 2. Thus, referring to FIG. 2, there is schematically illustrated therein a suitable overhead structure or building 28 having beams 30. The ground below or floor 32 is formed with an elongated pit 34. Situated at the bottom surface 36 of the pit 34 is at least one guide stud 38 capable of receiving the bottom end of the pipe 22 when the latter is set up on end in the manner shown in FIG. 2. Thus, the stud 38 guides and determines the position of the upright pipe 22.

The pipe 22 is set up in a position where it is surrounded by the vapor barrier 26 which is actually in the form of a tubular mold and surrounds the pipe 22 so as to define with the latter an elongated tubular space 40 limited inwardly by the exterior surface of the pipe 22 and outwardly by the interior surface of the pipe 26.

The roof beams 30 are preferably I-beams, so that they can serve as tracks for one or more carriages 42, as shown schematically at the central one of the roof beams 30 in FIG. 2. This carriage 42 supports an annular plate 44 on which are mounted several electrically actuated winches 46. Tubular cables 48 extend downwardly from the several winches 46, and in the illustrated example there are three winches spaced from each other by 120° about the axis of the pipe 22. The latter axis extends up centrally between the three winches 46.

The bottom ends of the tubular cables 48 are connected with a ring 50 which, by actuation of the winches 46 is lowered into the tubular space 40 to a location adjacent to the bottom end thereof. The controls are carried out remotely from the control structure by way of a suitable console 52 accessible to the operator and having the necessary electrical switches, hydraulic valves, and the like, which will carry out the required operations through the electrical or hydraulic conduits 54 schematically indicated in FIG. 2.

Referring now to FIGS. 3 and 4, it will be seen that the ring 50 carries at its inner periphery 56 an adjustable guide means 58 which engages the exterior surface of the pipe 22. The ring 44 has an outer periphery 60 which carries an outer adjustable guide means 62 engaging the inner surface of the tubular mold 26. As is apparent from FIGS. 3 and 4, the guide means 58 and 62 each take the form of rollers 64 mounted for free location on shafts which can be adjustably displaced by springs or the like inwardly and outwardly with respect to the common axis of the pipe 22 and mold 26, so that the rollers 64 are in free rolling engagement with the pipe 22 and mold 26 for maintaining the outer tubular mold 26 concentrically positioned at all times around the pipe 22.

One of the hollow tubular cables 48 is indicated in FIG. 3, while the remainder thereof are also indicated in FIG. 4. These tubular cables are fixed in any suitable way to the ring 50 which carries a plurality of discharge nozzles 66 respectively communicating with the conduits 48, so that a foamable plastic insulation 68 spray may be injected into the tubular space 40, in the manner indicated in FIG. 3 to build up the layer of insulation 70. It is to be noted that with this arrangement the layer of insulation is not limited to a thickness of 3 inches. It can have a thickness of 6 inches, for example.

As is indicated in FIG. 4, the ring 50 is formed with a plurality of cutouts 72 so that gas which evolves during the foaming and curing of the insulation 70 can escape freely upwardly through the tubular space 40.

As will be seen from FIG. 5, the locating stud 38 is in the form of a cylindrical guide member capable of being received within the lower bottom end of the pipe 22. Surrounding the stud 38 are a plurality of radially extending guide grooves 74 in which slidable supports 76 are freely shiftable. These supports 76 have upwardly directed bifurcated ends 78 which respectively receive edge portions of the bottom end of the tubular mold 26.

In order to facilitate the foaming and curing of the insulation about the pipe, particularly in the case of where the pipe 22 is made of metal, a heating means is situated at the bottom end of the pipe. The heating means in the illustrated example includes a conduit 80 (FIG. 5) through which a combustible gas may be supplied to the inner lower end portion of the pipe 22 and a conduit 82 through which combustion air may be supplied. The top open ends of these conduits 80, 82 are situated just above the guide 38 and will thus support a flame which is maintained during the process so that the heat which is generated from the flame will rise upwardly along the interior of the pipe 22.

Once the insulation has filed the space 40, the tubular mold 26 can simply be permitted to remain in position surrounding the insulation so as to protect the latter not only during handling and transportation of the conduit 20 (FIG. 1) but also in order to provide a vapor barrier in the manner described above. Thus, in this simple inexpensive manner, it is possible to provide a precisely manufactured layer of insulation of any desired thickness directly surrounding the pipe 22 and have a vapor barrier situated thereon as a result of the method of manufacturing the present invention.

The pipe 22 may be placed on end, over the guide stud 38 either before or after the concentric mold 26 is situated in its position surrounding the pipe 22. It is to be understood, moreover, that if desired more than one concentric tubular mold may be used. The heating of the pipe 22 is carried out in advance of the application of the foamable insulation, and for this purpose the fuel gas and air system, described above and shown in the lower part of FIG. 5, is provided with a suitable control means whose controls are situated at the console 52. Typically the pipe 22, when it is made of metal, is raised to a temperature of 120° F. by hot combustion gases flowing upwardly through the pipe. These hot gases may be recycled through the pipe, thus saving fuel, or hot air may be circulated through the pipe after being heated by air heater which is external to the pipe.

Typically, the inner pipe 22 may be 24 inches in diameter, while the outer pipe has a diameter of 36 inches, thus allowing for a 6 inch layer of insulation to be situated in the tubular space between the pipe and mold.

In a typical operation, the spacer which is formed by the ring 50 is lowered to an elevation near the bottom of the tubular space 40, and the external control means 52 are used to actuate and operate the foam dispensing devices. The spacer is withdrawn at such a rate that it remains at about 12 to 24 inches above the rising foam. The foam rise rate is determined mainly from the foam components which are used, the temperatures of these components and the metal pipe, the number and output of dispensing devices, and the annular volume being filled. Typically the spacer should be withdrawn at a rate of about 2.5 feet per minute when three foam dispensing devices, each dispensing 10 pounds of foam per minute, are employed using a fast rising foam on a 24 inch pipe that is being provided with insulation having a thickness of 6 inches and having a density of 3 pounds of foam per cubic foot.

Referring now to FIG. 6, one possible structure of one of the winches 46 is shown schematically. Thus, the supporting ring 44, which is connected to carriage 42 carries, on a suitable support, an idler gear 90 and a driving gear 92, both of which mesh with a ring gear 94 situated at the exterior periphery of one of the side flanges 96 of the winch 46. The winch has between its side flanges 96 a cylindrical core member 98 which forms with the flanges 96, the spool into which the hollow tubular cable 48 is coiled, and the inner end 100 of the tubular cable 48 extends through an opening of the cylinder 98 to communicate with the interior thereof. The flanges 96 extend inwardly beyond the cylinder 98 to form a pair of guide ribs 102 between which a channel-shaped annular member 104 is situated. This member 104 is of a U-shaped cross section having side walls whose outer free edges are slidably received between the inner flanges 102 of the winch. The transverse wall 106 of the channel 104 receives the foam plastic through a suitable supply conduit 108. Thus, the foam plastic can enter through the conduit 108 into the channel 104 to fill the latter and discharge through the opening 100 and along the interior of the coiled hollow conduit 48 which is free to turn while the conduit is wound and unwound. The cable is guided over a suitable roller 110 mounted on a pedestal 112 or the like, and it passes downwardly through the ring 44. The three assemblies which are spaced from each other by 120° and carried by the ring 44 are identical with that shown in FIG. 6. A suitable electric motor is operatively connected with the gear 92 so as to rotate the latter in one direction or the other, depending upon the control derived from the console 52, and in this way it is possible, with all the controls being identically carried out at the three winches 46, for the operator to raise or lower the ring while simultaneously supplying the foam plastic Alternatively to the arrangement described above, a single foam supply hose 48 could be used with a manifold pipe mounted on the ring 50 to supply each of the nozzles 66.

As is indicated in FIG. 7, the carriage 42 is guided for movement along a roof beam 30 which forms a track for the carriage 42. This carriage carries the supporting ring 44 and all of the structures suspended therefrom as described above.

The carriage 42 carries an electric motor 114 which through a suitable gear meshes with a second gear 116 which drives a roller 118 of the carriage 42, so that by turning this roller 118 in one direction or the other the entire carriage 42 and all of the structure suspended therefrom can be moved in one direction or the other along the roof beam 30. Thus, the operator can control from the console 52, through a suitable switch connected to the motor 114, movement of the carriage so as to shift the entire insulation supplying assembly longitudinally of the overhead structure along a beam 30.

Situated within the longitudinally extending pit 34 (FIG. 7) are a plurality of tubular molds 26 with the pipes 22 situated therein on a plurality of guide studs in the manner described above. Thus, while the tubular space 40 between one pipe and tubular mold is being filled, such as the space surrounded by the left mold 26 of FIG. 7, additional pipes and molds may be set up. When the operations in connection with one pipe and mold are completed, these operations may immediately continue with the next pipe and mold. In this way the single overhead apparatus of the invention can be used substantially continuously.

FIGS. 8–11 respectively illustrate different combinations of motions which may be carried out between the pipe 22 and the mold 26 on the one hand, and the ring 50 with the spray headers 66, on the other hand, during filling of the tubular space 40. Thus, referring to FIG. 8, as is schematically indicated, the pipe 22 and mold 26 can simply remain stationary while the ring 50 with all of the structure carried thereby is displaced upwardly, as indicated by the arrows 120, so that in this way a method as described above is carried out by simply raising the ring 50 with the spray headers at a rate which will maintain the spray headers a pre-determined distance above the foam insulation which is filling and rising within the space 40.

FIG. 9 diagrammatically illustrates a variation according to which, while the ring 50 with all of the structure carried thereby rises upwardly at a pre-determined rate, as is also indicated by the arrows 120, the pipe 22 and mold 26 simultaneously rotate about their common axis as indicated arrows 122. Therefore, with the rotary motion of the pipe and mold, as indicated in FIG. 9, combined with the straight vertical motion of the ring 50 and all of the structure carried thereby, the insulation, will be set into the space 40 along a helix providing an exceedingly uniform filling of the space 40.

With the arrangement shown in FIG. 10, the pipe 22 and mold 26 remain stationary, but in this case the ring 50 is oscillated back and forth as indicated by the arrows 124, and thus in this case also distribution of insulation will take place not only vertically but also circumferentially, providing filling along a zig-zag path as indicated by the arrow 126 in FIG. 10.

In FIG. 11, the pipe and mold also remain stationary but the ring 50 is continuously rotated, as indicated by the arrow 128, so that with the method of FIG. 11 the same results will be achieved as with the method of FIG. 9, except that in the case of FIG. 11 it is the ring that is rotated as it is simultaneously displaced vertically while in FIG. 9 the ring simply is raised vertically while the pipe and mold rotate. As may be seen from the arrow 130, in FIG. 11, the foam insulation is dispensed along a helical path in the space 40 and, of course, the same type of foam dispensing path will be provided with FIG. 9.

FIG. 12 schematically illustrates a structure which can carry out a method as shown in FIG. 9. Thus, referring to FIG. 12, it will be seen that the ring 50 is schematically shown in the space 40 defined between the pipe 22 and mold 26. One of the spray headers 66 is indicated also in FIG. 12. In the case of FIG. 12, however, instead of a guide means formed by rollers, the guide means, which is also adjustable, includes ball-and-socket assemblies 132 so that the rolling of the ball members in their sockets can accommodate the vertical displacement of the ring 50 which is combined with the circumferential movement of the pipe and mold.

With this arrangement, the guide stud 38' is directly carried by a turntable 134 co-axially fixed to a ring 136 which carries the turntable 134. This support ring 136 is supported for rotary movement about its axis in any suitable bearing 138 mounted on the floor within the pit 34, as described above. The turntable 134 fixedly carries at its periphery a ring gear 140 which meshes with a gear 142 driven by a motor 144, which may be controlled from a suitable electrical control structure at the console 52, shown in FIG. 2. Thus, gear 140 may be driven so as to rotate the turntable and thus rotate the mold and pipe. In this way, the structure of FIG. 12 will provide the method shown in FIG. 9. Of course, it is also possible to drive the motor 144 first in one direction and then in an opposite direction, using a reversible motor with a suitable switching arrangement which is switched between different positions periodically, so that in this case the pipe and mold could oscillate back and forth to provide a method equivalent to that of FIG. 10, since in this case it would be the pipe and mold which turns back and forth rather than the ring 50.

Referring now to FIG. 13, it will be seen that the ring 50', which corresponds to the ring 50, is suspended in the same way from the hollow tubular cables 48. However, the spray heads or nozzles 66 do not directly communicate with the tubular cables 48 with this embodiment. Instead, the underside of the ring 50 carries a pair of annular concentric guides 146 and 148 of L-shaped cross section, so that these guides have inwardly directed flanges 150. A circular channel member 152 has outwardly directed flanges 154 resting on the flanges 150 and slidably guided thereby, so that the ring 152 can rotate with respect to the ring 50' with this construction. The bottom wall 156 carries the spray heads 66' which communicate with the interior of the channel 150 to which the foam insulation is delivered from the cables 48.

With this construction the outer side wall of channel 152 fixedly carries a ring gear 158 which meshes with a pinion 160 driven from a motor 162 which is controlled by a switching assembly located at the console 52. FIG. 13 shows the bracket 164 formed with the elongated slot 166 for adjustably receiving the shaft 168 which carries the roller 170 to form the adjustable guide means 62, and an inner guide means 58 is of the same construction. The roller supporting shaft 168 can be fixed along the slot 166 at any selected location, so that in this way the ring 50 or 50' can have its guide means adjusted to the particular thickness of the tubular space 40.

With the construction of FIG. 13 when the motor is operated the spray heads 66' will rotate, so that in the case where they rotate continuously a method as described above in connection with FIG. 11 will be provided, while in the case where the motor 162 is reversible and is intermittently operated first in one direction and then in an opposite direction, the method shown in FIG. 10 will be achieved.

In all of the cases shown in FIGS. 8–11, the rates of withdrawal and rotation are controlled by external means situated at the console 52 and the same is true of the controls for the devices which dispense the foamable material.

Of course, with the ring 50, the cutouts 72 guarantee sufficient space for release of the evolving gas resulting from the foam reaction. In the case of FIG. 13, the ring 50' is so narrow as compared to the thickness of the tubular space 40 that there is sufficient space along the inner and outer peripheries of the ring 50' for the evolved gas to escape freely.

Thus, with the method and apparatus of the invention it is possible to apply a thickness of foam greater than can be applied with spray techniques. At the same time, the labor and application costs, as well as the application time, are reduced well below those required when preformed insulation material is manually positioned on the pipe. Furthermore, a corrosion barrier or coating may not be required on the inner pipe due to the integral structure of the system which prevents air and/or water from reaching this pipe. Material waste, which may run up to 20% in spray operation, is eliminated with the method and apparatus of the invention. The outer mold 26, if left in position surrounding and engaging the insulation, serves as an excellent vapor barrier assuring the long life and effectiveness of the insulation with no added labor cost. An important advantage achieved by the vertical filling of the space is that the destruction of the foam cells through shearing, which occurs if foam is allowed to rise in an annular space between horizontal pipes, is entirely eliminated. Uniform foam density is easily achieved with the method and apparatus of the invention, so that the possibility of forming voids is eliminated. The outer mold 26 gives an easy, damage-free handling of the insulated pipe which can easily be fabricated in one country and shipped to another country or to any location for intended use.

Thus, the invention is specifically suited to emerging cryogenic applications, inasmuch as it provides a means for applying sufficient thicknesses of the high effectiveness foams needed in cryogenic service. Air leaks, which destroy the integrity of vacuum-insulated cryogenic systems, are not possible with the product manufactured by the method and apparatus of the invention.

While specific embodiments of the invention have been shown and described in detail to illustrate the application of the inventive principles, it will be understood that the invention may be embodied otherwise without departing from such principles.

What is claimed is:

1. A metallic pipe insulating method comprising the steps of placing a metallic pipe, which is to be surrounded with insulation, in an upright position surrounded by and spaced from an outer tubular mold which defines with the pipe an elongated tubular space limited inwardly by the exterior surface of the pipe and limited outwardly by the interior surface of the mold, contacting the exterior surface of the pipe and the interior surface of the mold with an annular filling device, lowering the filling device to the bottom of said tubular space to thereby concentrically position said pipe to said mold, directing a plurality of streams of foamable plastic insulation material downwardly from said annular filling device, gradually raising the filling device as insulation material is ejected therefrom into the tubular space, and internally heating the entire length of the interior surface of the pipe as the filling device is raised.

2. A method as recited in claim 1 and wherein the filling device, on the one hand, and the pipe and surrounding tubular mold, on the other hand, form a pair of assemblies, and including the step of turning at least one of said assemblies relative to the other about the axis of the pipe simultaneously with the upward movement of the filling device.

3. The method of claim 1 including the step of continuously rotating the filling device as it is raised.

4. The method of claim 1 including the step of rotationally oscillating the filling device back and forth as it is raised to provide uniform distribution of insulation.

References Cited

UNITED STATES PATENTS

| 3,141,193 | 7/1964 | Slemmons | 25—37 X |
| 3,253,731 | 5/1966 | Fink et al. | 264—45 X |
| 3,328,496 | 6/1967 | Graves | 264—45 |
| 3,366,718 | 1/1968 | Komada | 264—269 X |

OTHER REFERENCES

Hoppe, P.; "Sandwich Laminates by in-situ PU Foaming;" PLASTICS; January 1965; pp. 71–77.

ROBERT F. WHITE, *Primary Examiner.*

T. J. CARVIS, *Assistant Examiner.*

U.S. Cl. X.R.

18—30, 36; 25—103; 264—262, 278